March 21, 1933. A. BECHLER 1,902,754
AUTOMATIC LATHE FOR HIGH SPEED WORK
Filed May 20, 1932 4 Sheets-Sheet 1

Inventor:
André Bechler

March 21, 1933. A. BECHLER 1,902,754
AUTOMATIC LATHE FOR HIGH SPEED WORK
Filed May 20, 1932   4 Sheets-Sheet 2
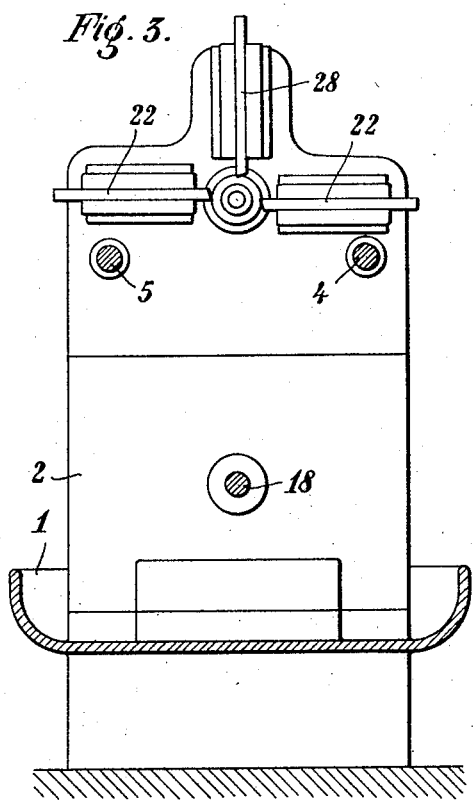
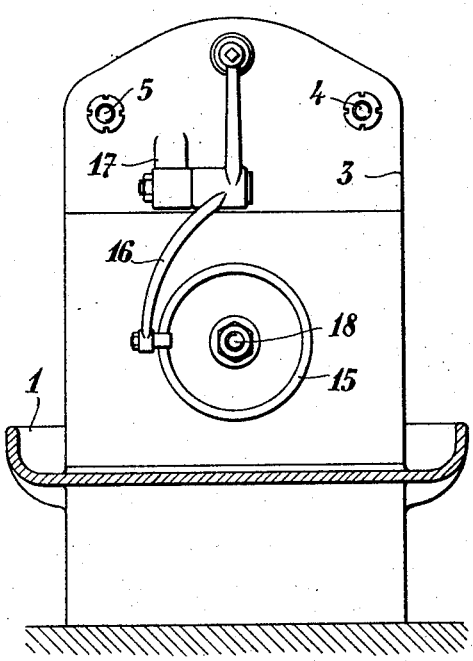
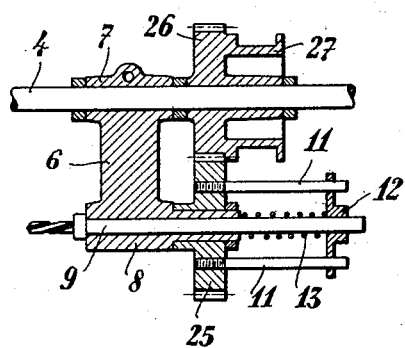
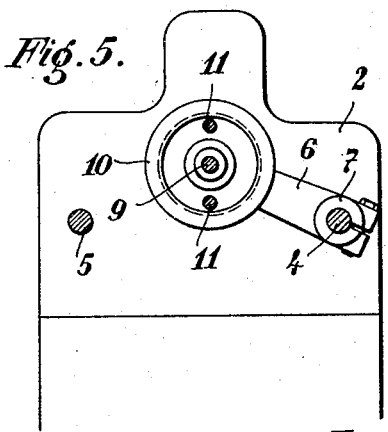
Inventor:
André Bechler
By
Attorney March 21, 1933. A. BECHLER 1,902,754

AUTOMATIC LATHE FOR HIGH SPEED WORK

Filed May 20, 1932 4 Sheets-Sheet 3

Inventor:
André Bechler

March 21, 1933. A. BECHLER 1,902,754
AUTOMATIC LATHE FOR HIGH SPEED WORK
Filed May 20, 1932  4 Sheets-Sheet 4
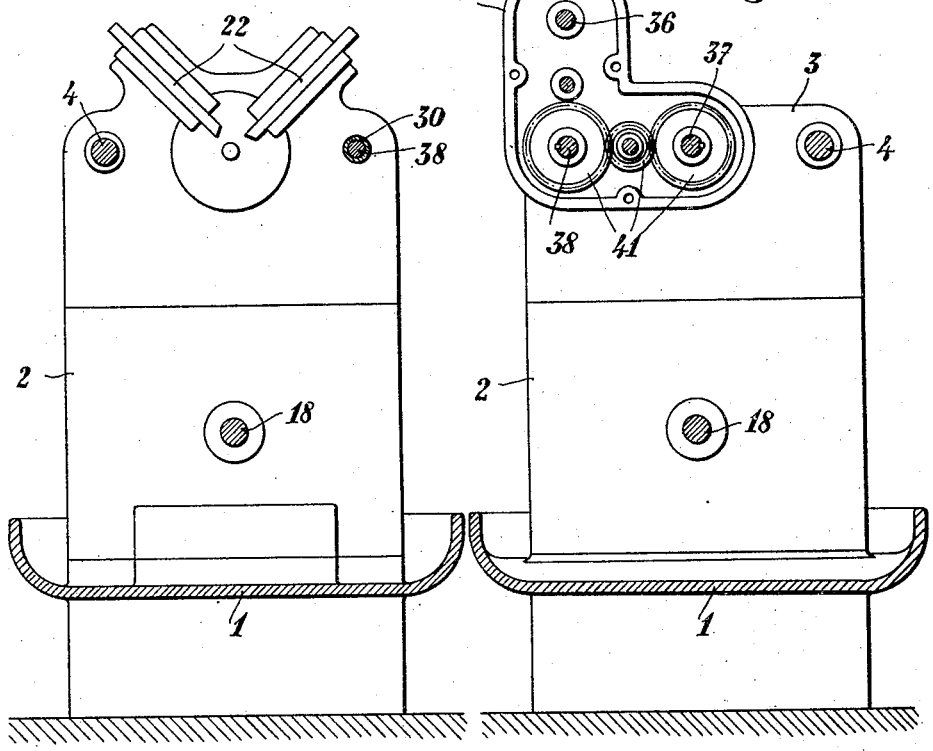

Patented Mar. 21, 1933

1,902,754

UNITED STATES PATENT OFFICE

ANDRÉ BECHLER, OF MOUTIER, SWITZERLAND

AUTOMATIC LATHE FOR HIGH SPEED WORK

Application filed May 20, 1932, Serial No. 612,594, and in Switzerland April 30, 1932.

The present invention relates to automatic lathes for high speed work of the kind where the base of the head stock projects to some extent on the side of the tool and carries a tail stock member connected to the head stock by means of one or several rods. Such lathes are especially useful for high speed work on metals or on synthetic resins composed of caseines etc. which when being turned will produce a very bulky heap of shavings. Since the high speed lathes can only be utilized with advantage when the movements of the different tools are very quick it is of the greatest importance that the masses carrying the different tools be as small as possible. But in such lathes the bulks of the moving parts have not yet been reduced to a considerable amount and so the maximum output could not be obtained.

It is the object of the present invention to reduce considerably the bulk of the moving parts and the invention consists therefore in that at least one of the connecting rods carries a head wherein at least one spindle acts as a tool holder and turns at a different speed from that of the main spindle and is adapted to be moved longitudinally, coaxially or not, with the main spindle, while the head does not participate in such movements.

Figure 1:
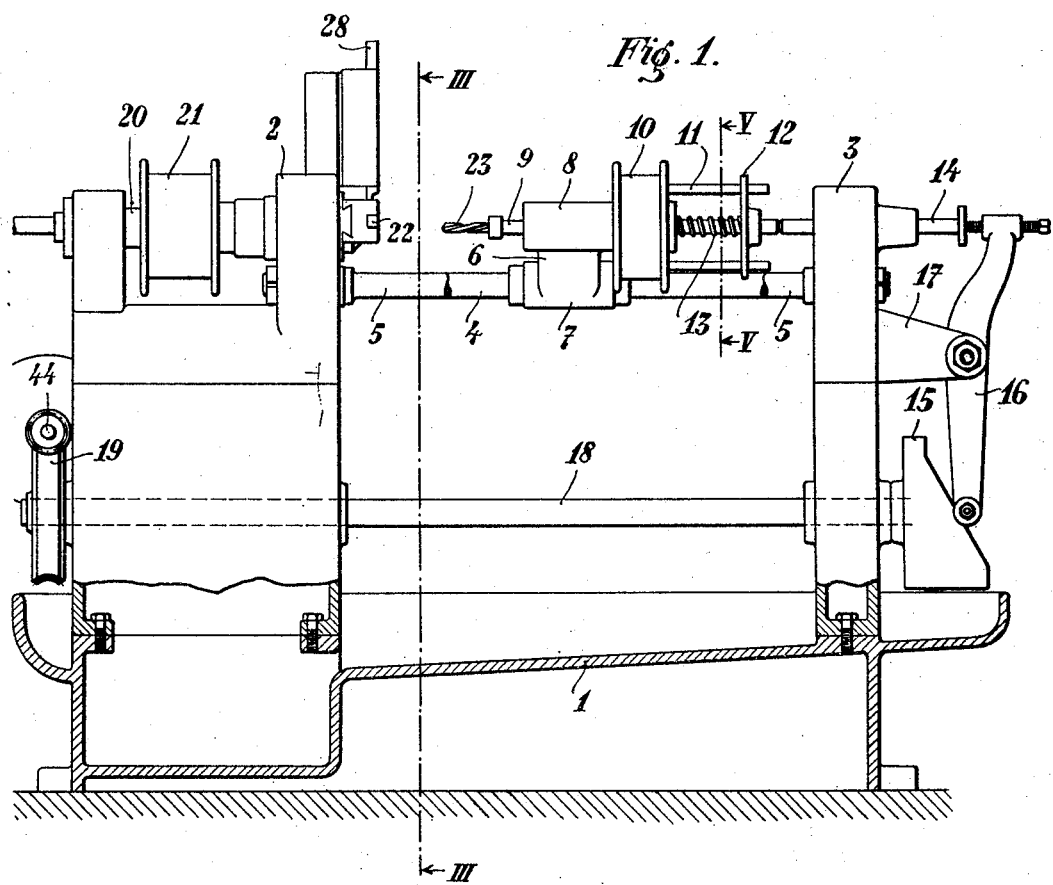
Figure 2:
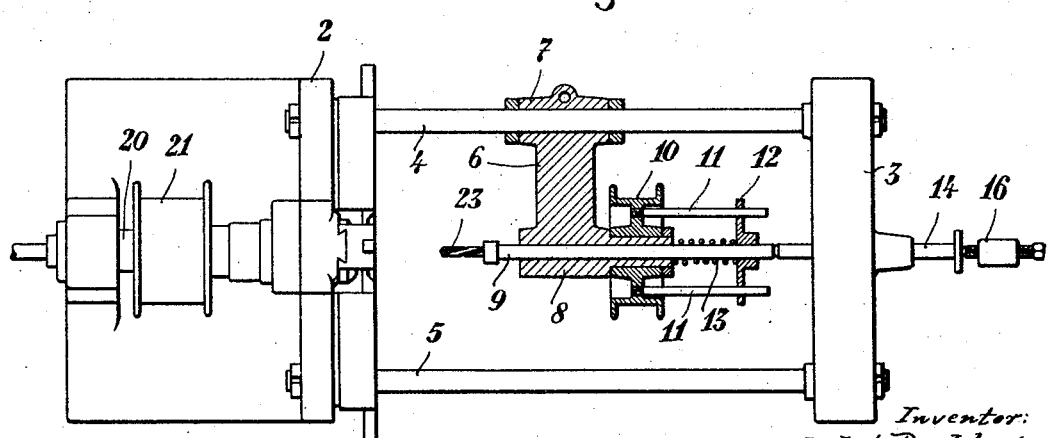
Figure 7:
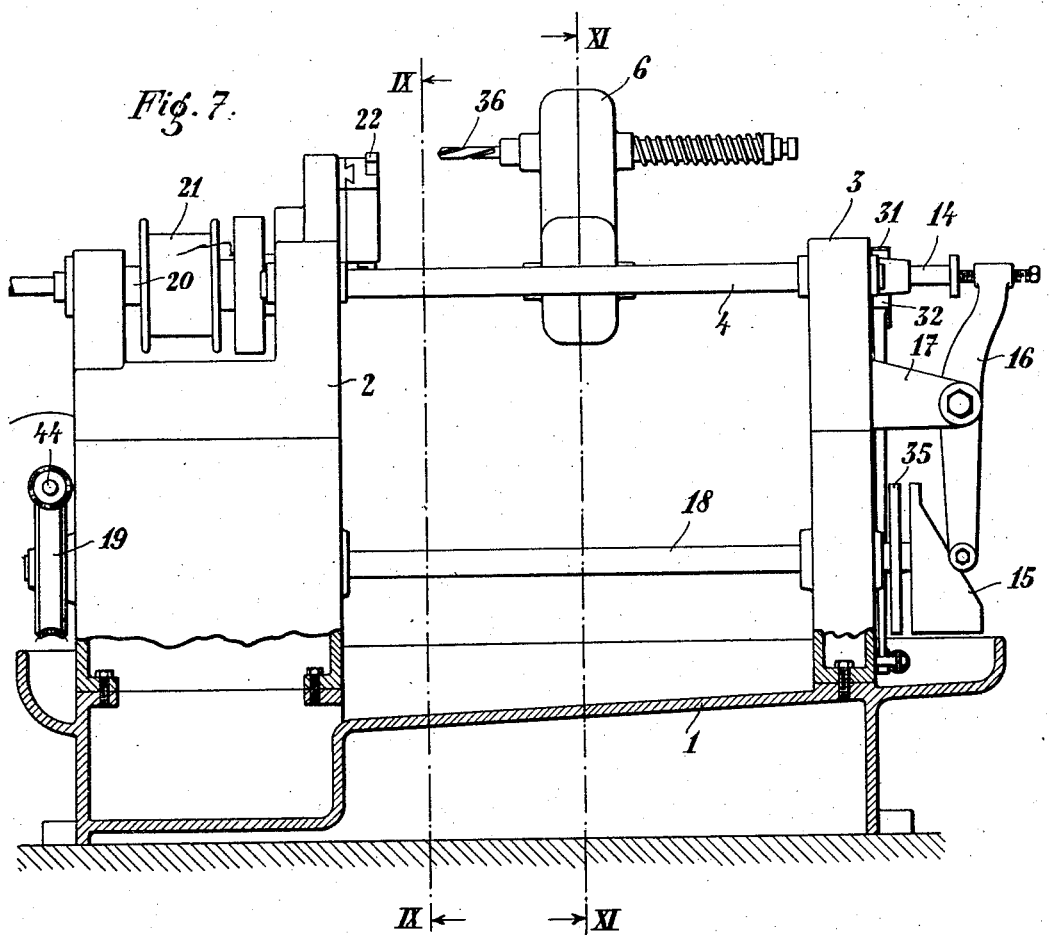
Figure 8:
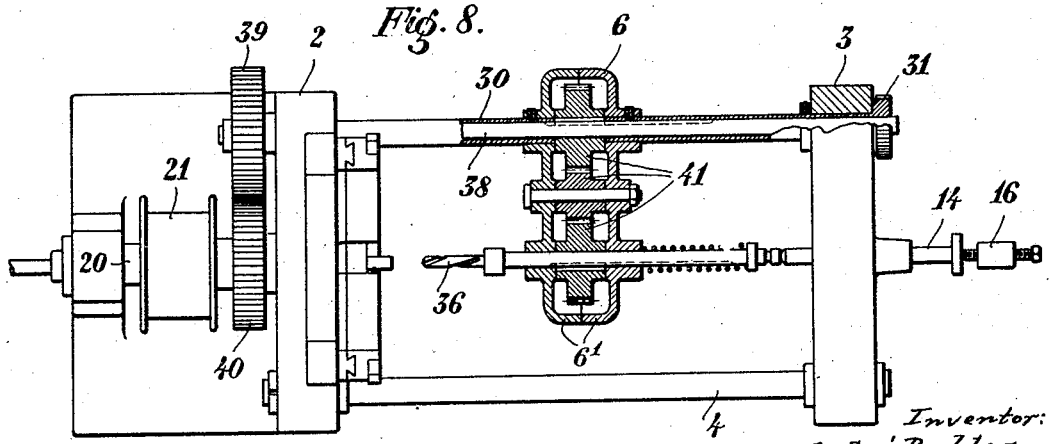

The annexed drawings represent some examples of lathes according to the present invention. There is:

Fig. 1 is a side elevation,
Fig. 2 a plan,
Fig. 3 a cross-section on line III—III in Fig. 1,
Fig. 4 an end elevation seen from the right of Fig. 1,
Fig. 5 a cross-section on line V—V in Fig. 1 and
Fig. 6 a sectional view of another form of a detail.
Figs. 7 to 11 refer to a second form of the invention,
Fig. 7 is a side elevation, Fig. 8 a plan, Fig. 9 a cross-section on line IX—IX in Fig. 7, Fig. 10 an end view and Fig. 11 a cross-section on line XI—XI of Fig. 1.

Fig. 12 is a detail view of a third form of the invention.

The lathe as represented has a trough-shaped base 1 upon which are mounted on one side a hollow casing 2 with the head stock and on the other side a standard 3 with the tail stock. Both casing and standard are connected by the rods 4 and 5. These rods are rigid and rod 4 carries a movable head 6 clamped fast by means of a clamp 7. This head comprises a bearing 8 with a tool holder spindle 9 adapted to be moved longitudinally and rotatably by a loose pulley 10 moved from a disk 12 fast to the spindle 9 and two rods 11 screwed to the pulley and stuck across two holes of the disk.

A spring 13 is inserted between the bearing 8 and the disk 12 and tends to keep the spindle bearing on a piston 14 which is slidingly held within the standard 3 and contacts with a lever 16 pivotally held by a bracket 17 and controlled by a cam 15. The cam 15 is driven from the main shaft 44 by means of the helicoidal gear 19 and the intermediate shaft 18. The work piece, in this case a rod of metal, is stuck through the head stock 20 provided with a driving pulley 21 and is fed by a combination of nippers or dogs not shown within reach of the tools 22 which are moved in slides by means of cams sheltered within the hollow casing 2.

It is easily seen that with this arrangement it will be possible to work upon the work piece which has been partially prepared by the tools 22 with a drill 23 either during the turning process by giving to the spindle a speed suited to that of the work piece or after having stopped the work piece by drilling into the turned off face side of the work piece an eccentrical hole.

In the arrangement according to Fig. 6 the spindle 9 is rotated by means of the rods 11 screwed into the loose pinion 25 and taken along by a disk 12 fast to the spindle 9. Pinion 25 meshes with a pinion 26 which is cast in one piece with the driving pulley 27.

Owing to the fact that the head is secured to rod 4 by clamping only it may be swung out on this rod and be adjusted into different positions with regard to the turning axis.

If there are several spindles like 9 carrying drills of different diameter or cutters and taps the moving of the head around the rod which carries the same may be controlled in any suitable manner for instance by means of a hollow shaft extending to the end of the standard and provided with means combined with cams which like the cam 15 could be arranged at the end of the shaft 18 sheltered from the shavings by the standard.

In the working form as in Figs. 7, 8, 9 and 10 we see the same kind of lathes. All the different parts: the base 1, the casing 2, the standard 3 and the rods and the movable head 6 are to be found here as in the before described lathe. The head 6 however comprises here a two part housing 6¹ rigidly connected to a hollow shaft 30 rotatably mounted in the casing 2 and the standard 3. On the outer side of this latter the shaft 30 carries a pinion 31 meshing with a toothed segment 32 which is pivoted in 33 and bears with a friction roller 34 on the edge of a cam 35 fixed to the shaft 18. This cam will control the positions of the head 6 and will bring one time the one tool and the other time the other tool, 36 or 37, into line with the turning axis. The rotating movement is given to these tools by a shaft 38 arranged within the hollow shaft 30 and provided with a gear wheel 39 meshing with wheel 40 fast to the main spindle of the lathe. A spur gear system 41, the first wheel of which is keyed to the shaft 38, transmits to the tools 36, 37 the required rotation each time that by the movements of the cam 35 they will come into line with the piston 14 which here also is operated by a lever 16 and a cam 15 as in the former examples.

Fig. 9 shows the arrangement of the tools 22 for the slicing operation. The cams working these tools are arranged within the hollow casing 2.

The cams 15 and 35, arranged as they are, are entirely sheltered from the shavings which are produced in the space between the head and the tail stock.

In the working form according to Fig. 12 the head 6 comprises six different tools disposed at 60° from each other. These tools are marked only diagrammatically. They are supported by a hollow rod 30 comprising an inner axis 38 which is driven from the gears in the head stock and are adjusted in their respective positions by means of toothed segments 31, 32 or by any other mechanical device for instance by means of the well known Maltese cross. The exact positions of the tools is assured by a pawl 43 which engages notches 42 in the periphery of the head 6.

What I claim as new is:

1. In an automatic lathe for high speed work and in combination, a head stock having a hollow base provided with a trough-like extension towards the tail stock, a tail stock mounted upon said extension and connecting rods between head stock and tail stock, a head comprising a housing enclosing the tool with driving means and mounted on one of the rods, a spindle, a tool holder slidingly and rotatably held within said housing and a piston-like member held slidingly in the tail stock and adapted to serve as an axial abutment for the working tool.

2. In an automatic lathe for high speed work of the kind described, and in combination, a head stock having a hollow base provided with a trough-like extension towards the tail-stock, a tail stock mounted upon said extension and connecting rods between head stock and tail stock, a head comprising a housing enclosing the tool with driving means and mounted angularly adjustable on one of the rods left hollow, a driving shaft arranged within said hollow shaft, at least one spindle, as tool holder, held slidingly and rotatably within said housing, a system of spur wheels constituting the means for transmitting movement from the said driving shaft to the spindle and a piston like member held in the tail stock and slidingly adapted to serve as an axial abutment for the working tool.

3. In an automatic lathe for high speed work of the kind described, and in combination, a head stock having a hollow base provided with a trough-like extension towards the tail stock, a tail stock mounted upon said extension and connecting rods between head stock and tail stock, a head comprising a housing enclosing the tool with driving means and mounted angularly adjustable on one of the rods left hollow, a driving shaft arranged within said hollow shaft, at least one spindle, as tool holder held slidingly and rotatably within said housing, a system of spur wheels constituting the means for transmitting movement from the said driving shaft to the spindle, a piston-like member held slidingly in the tail stock to constitute an axial abutment for the spindle and a system of cams and levers operated from the main shaft and adapted to guide said piston like member.

In testimony whereof I affix my signature.

ANDRÉ BECHLER.